US008224848B2

(12) United States Patent
McCreight et al.

(10) Patent No.: US 8,224,848 B2
(45) Date of Patent: Jul. 17, 2012

(54) SYSTEM AND METHOD FOR ENTROPY-BASED NEAR-MATCH ANALYSIS

(75) Inventors: Shawn McCreight, Pasadena, CA (US); Dominik Weber, Los Angeles, CA (US)

(73) Assignee: Guidance Software, Inc., Pasadena, CA (US)

( * ) Notice: Subject to any disclaimer, the term of this patent is extended or adjusted under 35 U.S.C. 154(b) by 210 days.

(21) Appl. No.: 12/722,482

(22) Filed: Mar. 11, 2010

(65) Prior Publication Data
US 2010/0235392 A1 Sep. 16, 2010

Related U.S. Application Data

(60) Provisional application No. 61/160,634, filed on Mar. 16, 2009.

(51) Int. Cl.
G06F 17/30 (2006.01)
(52) U.S. Cl. ............... 707/780; 707/687; 706/1; 706/45
(58) Field of Classification Search .................. None
See application file for complete search history.

(56) References Cited

U.S. PATENT DOCUMENTS

| | | | | |
|---|---|---|---|---|
| 6,230,155 | B1 * | 5/2001 | Broder et al. .................. | 1/1 |
| 6,282,698 | B1 * | 8/2001 | Baker et al. ................. | 717/118 |
| 6,449,393 | B1 | 9/2002 | Peters | |
| 7,376,680 | B1 | 5/2008 | Kettler et al. | |
| 7,930,332 | B2 * | 4/2011 | Acar et al. ................. | 708/250 |
| 2003/0236993 | A1 * | 12/2003 | McCreight et al. ......... | 713/200 |
| 2005/0223238 | A1 | 10/2005 | Schmid et al. | |
| 2007/0152854 | A1 | 7/2007 | Copley | |
| 2007/0245420 | A1 | 10/2007 | Yong et al. | |
| 2007/0256057 | A1 | 11/2007 | Matsubara | |
| 2008/0184367 | A1 | 7/2008 | McMillan et al. | |
| 2008/0263669 | A1 * | 10/2008 | Alme ............................. | 726/24 |
| 2009/0190662 | A1 * | 7/2009 | Park et al. ................. | 375/240.16 |

OTHER PUBLICATIONS

Jesse Kornblum, "Identifying almost identical files using context triggered piecewise hashing", Digital Investigation, 2006.*
Dustin Hurlbut, "Fuzzy Hashing for Digital Forensic Investigators", Jan. 9, 2009.*
Monge eat al, "An Efficient domain-independent algorithm for detecting approximately duduplcate database records", Uninversity of California, 1997.*
Borwein et al, "Moment-Matching and Best Entropy Estimation", Journal of Mathematical Analysis and Applications 185, 1994.*
David M. Loewenstern, "Significantly Lower Entropy Estimates for Natural DNA Sequences", DIMACS Technical Report 96-51, 1996.*
Neemuchwala et al, "Image matching using alpha-entropy measures and entropic graphs", University of Michigan, 2004.*
International Search Report and Written Opinion dated Apr. 26, 2010 for International Application No. PCT/US 10/27052, 8 pages.

* cited by examiner

*Primary Examiner* — Etienne Leroux
(74) *Attorney, Agent, or Firm* — Christie, Parker & Hale, LLP

(57) ABSTRACT

A system and method for an entropy-based near-match analysis identifies target files that are almost, but not identical, to a reference file. A computing processor computes entropies of the reference and target files, and determines the likeness of the target files to the references file based on the computed entropies. The computing processor determines a near match between the target file and the reference file if the likeness of the two files is within a user-defined tolerance level. According to one embodiment of the invention, the information entropy is a weighted value that takes into account the size of the file.

35 Claims, 14 Drawing Sheets

| Byte # | 0 | 1 | 2 | 3 | ... | 200 |
|---|---|---|---|---|---|---|
| $0^{th}$ Der. | 3 | 5 | 2 | 10 | | |
| $1^{st}$ Der. | Not defined | 2 | -3 | 8 | | |

FIG. 3

| Byte Instances | 0 | 1 | 2 | 3 | ... | 200 |
|---|---|---|---|---|---|---|
| $0^{th}$ Der. | 3 | 5 | 2 | 10 | | |

| | Machine Name | Number of Exact Matches | Maximum Likeness | Average Likeness | Number of Near Matches |
|---|---|---|---|---|---|
| ☐ 1 | 2ksrvond | 12 | 78.637 | 39.31 | 25 |
| ☐ 2 | EVIL6 | 7 | 90.012 | 38.07 | 25 |
| ☐ 3 | DEV-3Z3D1G1 | 0 | 57.873 | 20.98 | 25 |
| ☐ 4 | AF-W2K3ENR2TEST | 0 | 57.873 | 21.813 | 25 |
| ☐ 5 | GSI-200183 | 0 | 57.873 | 22.869 | 25 |
| ☐ 6 | VMTESTUSER | 0 | 19.283 | 13.96 | 25 |
| ☐ 7 | EESAFEV6 | 0 | 0 | 0 | 0 |

Constraint: None

FIG. 13

Entropy Near-Match Analyzer\Machines

| Machine Name | Number of Exact Matches | Maximum Likeness | Average Likeness | Number of Near Matches |
|---|---|---|---|---|
| 2ksrvond | 12 | 78.637 | 39.31 | 25 |
| EVIL6 | 7 | 90.012 | 38.07 | 25 |
| DEV-3Z3D1G1 | 0 | 57.873 | 20.98 | 25 |
| AF-W2K3ENR2TEST | 0 | 57.873 | 21.813 | 25 |
| GSI-200183 | 0 | 57.873 | 22.869 | 25 |
| VMTESTUSER | 0 | 19.283 | 13.96 | 25 |
| EESAFEV6 | 0 | 0 | 0 | 0 |

FIG. 14

SYSTEM AND METHOD FOR ENTROPY-BASED NEAR-MATCH ANALYSIS

CROSS-REFERENCE TO RELATED APPLICATION(S)

This application claims the benefit of U.S. Provisional Application No. 61/160,634, filed on Mar. 16, 2009, the content of which is incorporated herein by reference.

This application contains subject matter that is related to the subject matter in U.S. Pat. No. 6,792,545, the content of which is incorporated herein by reference.

BACKGROUND OF THE INVENTION

U.S. Pat. No. 6,792,545, assigned to the Assignee of the present application, discloses a system and method for performing secure investigations of networked devices over a computer network. Part of the investigation might entail locating a document in a target device that is identical to a reference document. This might be accomplished, for example, by computing a hash value of the reference document and then comparing the computed hash value against the hash value of the documents in the target device. Two documents with matching hash values are deemed identical to one another.

One way in which a malicious user of the target device may frustrate the use of cryptographic hashing to locate files of interest is by making minor alternations to the files. Changing even a single bit of a file changes its cryptographic hash. Thus, a forensic investigation system that uses a set of known cryptographic hashes for locating matching files is unsuccessful if an otherwise identical file has data that has been inserted, modified, or deleted.

One way to address this problem is by using a fuzzy hashing algorithm such as, for example, a fuzzy hashing algorithm known as "ssdeep." In general terms, fuzzy hashing constructs hash signatures of chunks of data whose boundaries are determined by the context of the input. The hashes are then used to compute a numerical difference, usually expressed as a percentage, between the two files to which the fuzzy hashing algorithm was applied.

One drawback in using fuzzy hashing for locating almost identical files is that the hash values that are returned are not fixed in size. This makes storing and retrieving of the values, in a database, inefficient. Furthermore, the returned numerical difference is not always proportional to the actual differences that exist in two files that are being compared. Furthermore, the algorithm for computing ssdeep is slow relative to existing hash functions.

Accordingly, what is desired is a system and method for locating almost identical files via mechanisms other than fuzzy hashing.

SUMMARY OF THE INVENTION

Embodiments of the present invention are directed to a system and method for identifying one or more files in one or more target machines that are a near-match to a reference file. The method includes computing or identifying an entropy of the reference file and outputting a first entropy value. A second entropy value of a target file stored in the one or more target machines is also identified. A likeness of content in the target file is determined to content in the reference file based on the first and second entropy values. A tolerance threshold is also identified. A near-match between the target file and the reference file is determined if the likeness of the target file to the reference file is within the tolerance threshold. Information on the target file is then displayed in response to the determining of a near-match.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 3 is a conceptual layout diagram of an exemplary input file according to one embodiment of the invention;

FIG. 4 is a conceptual layout diagram for organizing 0th derivative values of a file for calculating a 0th order entropy according to one embodiment of the invention;

FIGS. 9A-9B are screen shots of a graphical user interface (GUI) for configuring certain parameters for performing an entropy-based near-match analysis according to one embodiment of the invention;

FIG. 10 is a screen shot of a GUI for building entropy sets according to one embodiment of the invention;

FIG. 13 is a screen shot of a GUI for providing information on matches per target machine according to one embodiment of the invention; and FIG. 14 is a screen shot of an analysis report according to one embodiment of the invention.

DETAILED DESCRIPTION

Figure 1:
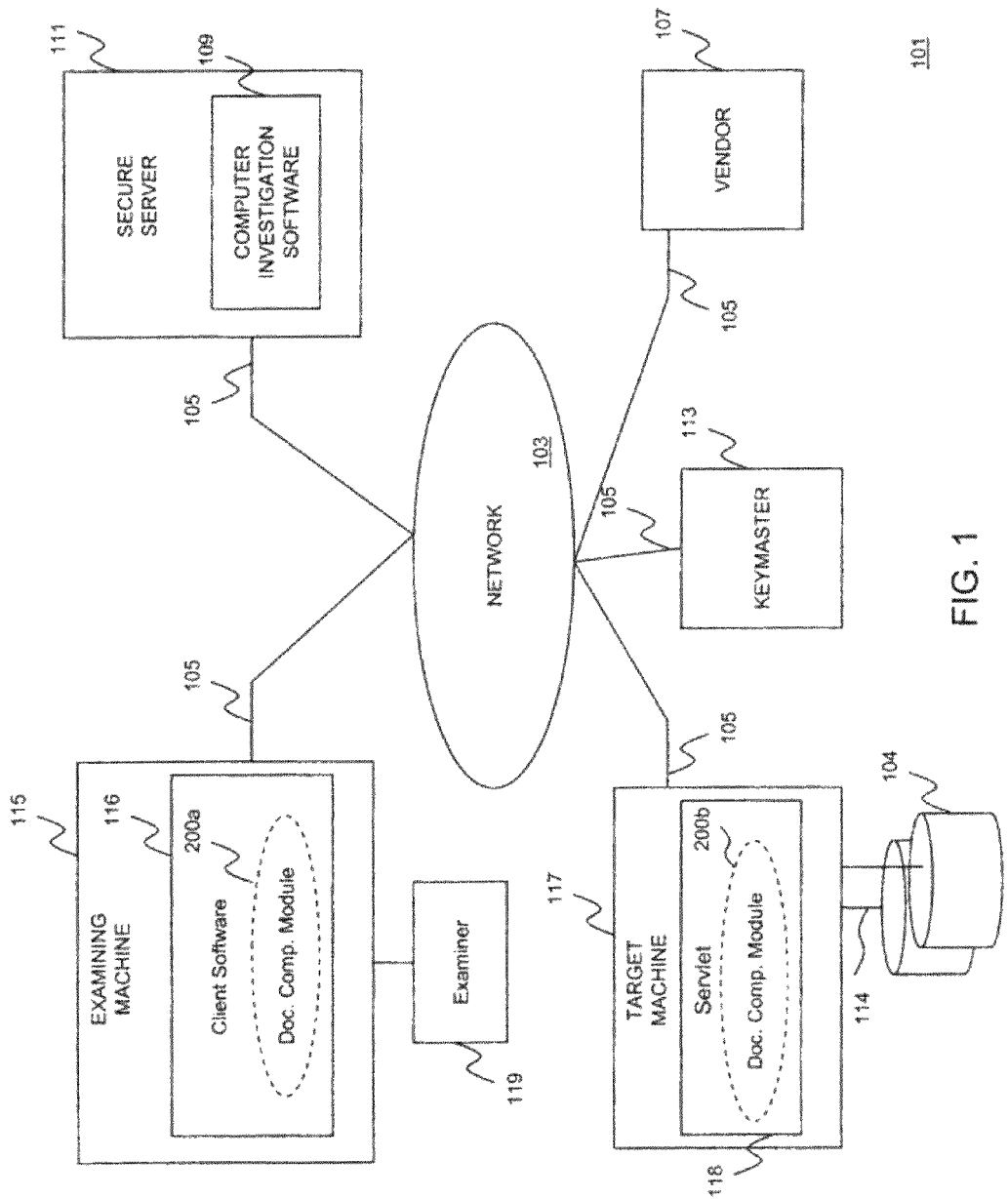
FIG. 1 is a block diagram of an exemplary computer investigation system according to one embodiment of the invention.

In general terms, embodiments of the present invention are directed to a forensic investigation system that identifies files stored in a target machine, hereinafter referred to as target files, that are almost, but not exactly, identical, to a reference file. The identification is made when it would not otherwise be made via traditional cryptographic hashing techniques. For example, the target files may be identical to the reference file except for one or more bytes of data that have been added, removed, or modified, in the target files. Of course, identical files may also be identified via the embodiments of the present invention, as well as files that may be quite different and not almost identical to the reference file.

Unlike other systems and methods configured to identify like files, embodiments of the present invention are configured to identify files in a context free manner. That is, the likeness of content contained in two files may be identified for any types of files, and is not constrained to identification of specific types of files, such as, for example, files containing text. Furthermore, unlike prior art mechanisms such as ssdeep that return hash values that are not fixed in size, the information returned from the target machines for determining likeness of a target file to a reference file is compact and fixed in size. In this regard, the information that is used for determining the likeness of the target file is an information entropy value of the file. According to one embodiment, an information entropy identifies a randomness of information contained in a file.

According to one embodiment of the invention, a computing processor engages in a near-match analysis by computing the information entropy of the reference and target files, and determining the likeness of the target files to the reference file based on the computed entropies. The computing processor determines a near match between the target file and the reference file if the likeness of the two files is within a user-defined tolerance level. According to one embodiment of the invention, the information entropy is a weighted value that takes into account the size of the file.

Although it is possible for two very different files to produce the same weighted entropy value, the probability of this happening is low. That is, two files with the same or similar weighted entropies are most likely to contain the same or similar data. Accordingly, the forensic investigation system according to embodiments of the present invention flag files with weighted entropies that are within a given tolerance of the entropy of a reference file as being files that may be similar to the reference file, and at least those files are transmitted to a forensic investigator for further review. Weighted entropy values take into account the size of the files being computed. According to another embodiment of the invention, instead of using weighted entropy values, original entropy values are used for determining the likeness of files. Hereinafter, the term entropy value is used generically to refer to either a weighted or not weighted (original) entropy value.

According to one embodiment of the invention, the difference in the entropy values of the reference and target files is representative of the differences of the data content in the two files. The larger the perceived difference of the contents of the two files, the bigger the difference in the computed entropy values. Similarly, the smaller the perceived difference of the contents of the two files, the smaller difference in the computed entropy values.

For example, a file containing the text HELLO THERE would be perceived by a viewer to be different from a file containing the text THERE HELLO, even if both files contain the same two words. Thus, the entropy values computed for these two files should reflect this difference. However, the reflected difference should be small enough to flag the second file as being similar to the first file.

FIG. 1 is a block diagram of an exemplary computer investigation system 101 that allows the identification of almost identical files during a forensic investigation session. The computer investigation system 101 includes various network devices coupled to a data communications network 103 over data communication links 105. The data communications network 103 may be a computer network, such as, for example, a public Internet, a private wide area network (WAN), a local area network (LAN), or other wired or wireless network environment conventional in the art. The network devices may include a vendor computer 107, a secure server 111, an examining machine 115, one or more target machines 117, and a keymaster computer 113. The data communication link 105 may be any network link conventional in the art, such as, for example, a direct wire, an infrared data port, a wireless communications link, global communications link such as the Internet, or any other communications medium known in the art.

A vendor having access to the vendor computer 107 provides the organization with a computer investigation software 109 which enables the organization to effectively perform forensic investigations, respond to network safety alerts, and conduct network audits and other investigations over the data communications network 103.

According to one embodiment of the invention, the investigation software is stored in a computer readable medium (e.g. ROM, flash memory, magnetic computer storage device, optical discs, and the like), that is accessed by the secure server 111. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the client) allows an authorized examiner to conduct searches of the target machines 117 and their associated secondary storage devices 104. In this regard, the examining machine 115 is a computer device with a processor configured to access a computer-readable media storing a client software 116 which includes the functionality and interoperability for remotely accessing the secure server 111 and corresponding target machines 117. For example, the processor may execute the client software to search one or more target machines for target files that are almost identical to a known reference file.

Each target machine 117 is exemplarily the subject of a computer investigation conducted by the examining machine 115. The target machine may be a portable device such as, for example, a laptop, personal digital assistant, or any device that may connect and disconnect from the network.

According to one embodiment of the invention, each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, or any other device configured to store data that may be subject to an investigation.

According to one embodiment, a servlet 118 installed on a particular target machine 117 responds to commands provided by the examining machine 115 to remotely discover, preview, and acquire dynamic and/or static data stored at the target machine and/or the associated secondary storage device(s) 104, and transmit the acquired data to the examining machine via the secure communication path created between the target machine and the examining machine. The servlet may also be configured to make entropy calculations of one or more files stored in the secondary storage devices 104, and communicate the entropy values to the examining machine via the secure communication path. The servlet may be implemented as any software module conventional in the art, and is not limited to applets in a web browser environment. Computer instructions for implementing the servlet may be stored in a computer readable media (e.g. ROM, flash memory, magnetic computer storage device, optical discs, and the like), that is accessed by the target machine.

The computer investigation system 101 illustrated in FIG. 1 further allows an authorized examiner direct or remote access to the examining machine 115 via an examiner device 119 in any manner conventional in the art. The examiner device 119 may be an input and/or output device coupled to the examining machine 115, such as, for example, a keyboard and/or monitor. The examiner device 119 may alternatively be a personal computer or laptop communicating with the examining device over a wired or wireless communication mechanism. According to one embodiment of the invention, the examiner is a trusted individual who safely stores in the examining machine 115, one or more encryption keys used for authenticating to the secure server 111 and conducting the secure investigation of the target machines 117, as is described in more detail in the above-referenced U.S. Pat. No. 6,792,545.

According to one embodiment of the invention, the client software 116 includes a document comparison module 200a with computer program instructions to compute or retrieve an entropy value of a reference file, and determine based on the entropy value whether the reference file is within a desired threshold of similarity with a target file stored in the secondary storage device 104 of a particular target machine 117. According to this embodiment, the files in the secondary device of the target machine are transmitted to the examining machine over the data communication links 105 to enable the entropy computation to be performed by the processor of the examining machine 115.

According to another embodiment of the invention, the entropy computation is performed by the processor in the target machine 117 that invokes a document comparison module 200b which may be similar to the document comparison module 200a run by the examining machine 115. Unlike the document comparison module 200a in the examining machine, however, the document comparison module included in the servlet helps eliminate unnecessary data transfer of documents that are outside the desired threshold of similarity. Instead, the documents that are transmitted to the examining machine 115 are documents that are determined by the document comparison module 200b to be similar to the reference file based on the entropy computations. Hereinafter, the document comparison modules 200a, 200b are collectively referred to as document comparison module 200.

Figure 2:
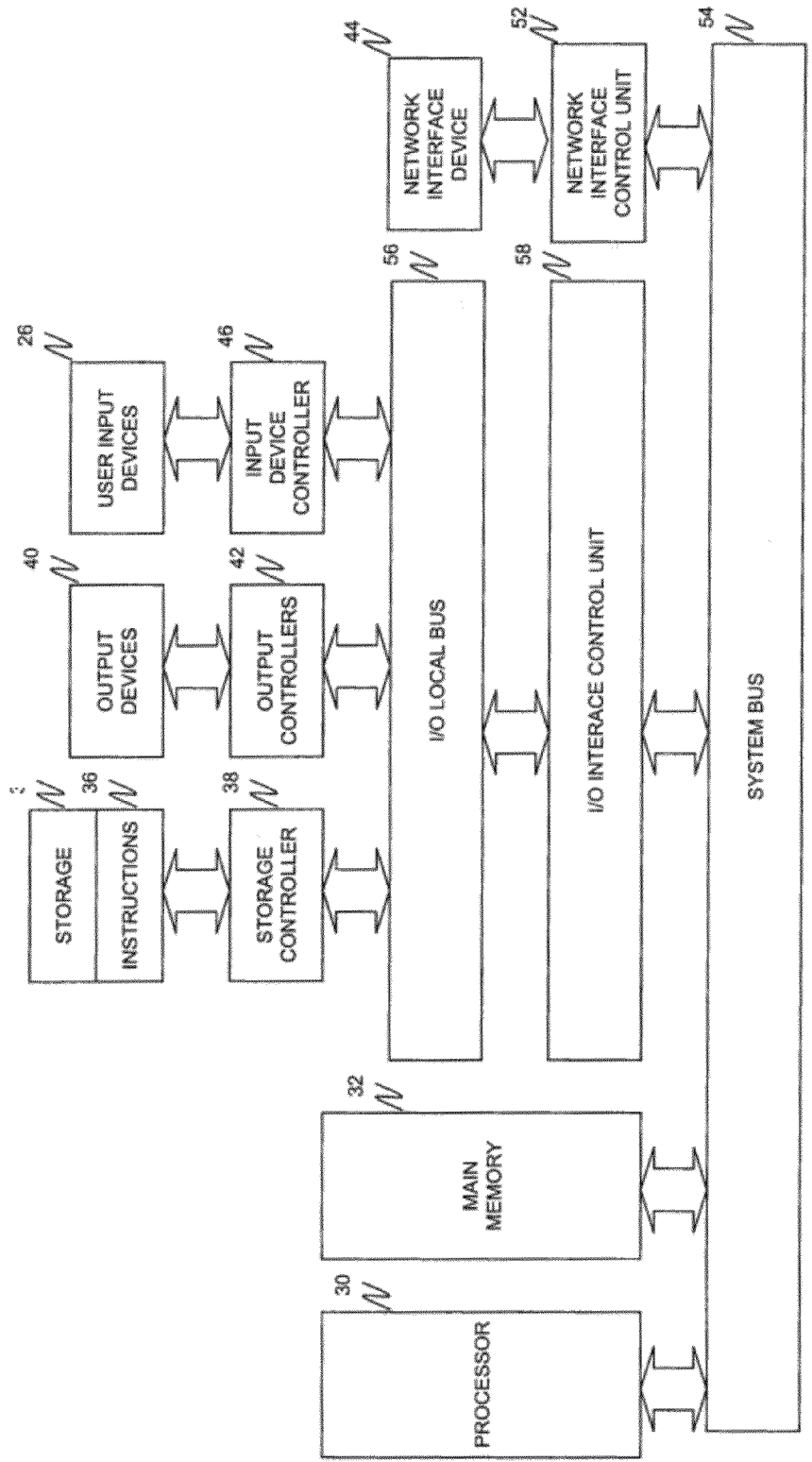
FIG. 2 is an architecture block diagram of examining and target machines according to one embodiment of the invention.

FIG. 2 is an architecture block diagram of the examining and target machines 115, 117 according to one embodiment of the invention. The machine 115, 117 includes a processor 30 operatively coupled via a system bus 54 to a main memory 32 and an input/output (I/O) interface control unit 58. The I/O interface control unit 58 is operatively coupled via an I/O local bus 56 to a storage controller 38. The processor 30 is coupled via the I/O interface control unit 58, the I/O local bus 56, and the storage controller 38, to a computer-readable medium such as, for example, storage device 34. Computer program instructions 36 for implementing different functionalities of the client software 116 or servlet 118, including the functionalities of the document comparison module 200 are stored in the storage device 34 until the processor 30 retrieves the computer program instructions and stores them in the main memory 32. The processor 30 then executes the computer program instructions stored in the main memory 32 to conduct a forensic investigation of a target device. As part of conducting the forensic investigation, the document comparison module 200 computes entropy values of at least the target files in a target machine 117 that is subject of a current forensic investigation, and determines whether the target files are similar to a reference file based on the computed entropy values.

The machine 115, 117 further includes one or more output devices 40 coupled to the I/O local bus via one or more output controllers 42. Such output devices may include, for example, a display device for displaying information such as, for example, contents of a file that has been flagged for investigation, or configuration parameters of the document comparison module 200.

The machine 115, 117 further includes one or more user input devices 26 coupled to the I/O local bus via an input device controller 46. A user may use a user input device to configure various parameters of the document comparison module 200.

Commands from the secure server 111 are received by a wired or wireless network interface device 44 controlled by a network interface control unit 52, and forwarded to the processor 30 via the system bus 54. Direct communication between the examining machine 115 and target machine 117 is also enabled by the network interface device 44.

According to one embodiment of the invention, the entropy calculation of a file may be based on the content of the file itself, or based on a difference in values between two adjacent blocks (e.g. bytes or other groupings of bits) of data. Taking a 0th derivative of the data contained in the file results in the data itself. Taking a 1st derivative of the data produces differences in values between two adjacent blocks of data. According to one embodiment of the invention, the entropy value that results from the entropy calculation is a double-precision floating point number ranging from 0 to 8. As the entropy value approaches 8, the more random, and hence, the more unpredictable, are the values in the file. Conversely, as the entropy value approaches 0, the less random, and hence, the more predictable, are the values in the file. A person of skill in the art should recognize that other range of entropy values may also be used instead of the range of 0 to 8.

FIG. 3 is a conceptual layout diagram of an exemplary input file containing 200 bytes of data. According to one embodiment of the invention, the data represents text. However, a person of skill in the art should recognize that other types of data might also be stored in the file, such as, for example, audio, images, video, graphics, and the like. The document comparison module is configured to work to identify almost identical files regardless of the specific nature of the data.

According to one embodiment of the invention, the text in the reference and target files are represented via an ASCII character set, ANSI character set, Unicode character set, or the like. An embodiment of the present invention supports 256 characters, numbered 0-255. A person of skill in the art should recognize, however, that more or less number of characters may be supported without departing from the scope and spirit of the invention.

With reference to FIG. 3, the exemplary file contains the following values which may be mapped to a specific character:

Byte 0: 3; Byte 1: 5; Byte 2: 2; Byte 3: 10

Taking the 0th derivative of the illustrated data results in the data itself, that is:

Byte 0: 3; Byte 1: 5; Byte 2: 2; Byte 3: 10

Taking the 1st derivative of the data produces a difference in value between block[n+1] and block[n], where n≧0. This difference is then stored in association with block[n+1]. As an example, taking the 1st derivate of the data illustrated in FIG. 3 produces the following values:

Byte 0: not defined; Byte 1: 2; Byte 2: −3; Byte 3: 8

According to one embodiment, the entropy calculation considers the probability of a byte having a particular value, given all the values in the entire file. That value might be a 0th derivative value (i.e. the data itself), or a 1st derivative value (herein referred to as a differential value), depending on the configuration of the document comparison module 200. For either value, a 0th order entropy calculation counts a number of occurrences for the file, in terms of number of bytes, of a specific value, for calculating a probability that a byte in the file will take that value.

FIG. 4 is a conceptual layout diagram for organizing 0th derivative values of a file for calculating a 0th order entropy according to one embodiment of the invention. The example in FIG. 4 shows that there are 100 bytes of data storing the value "2," whereas there are 10 bytes of data storing the value "1." Thus, according to this example, if a file has 200 bytes of data, the probability of a byte having the value "2" is 0.5, and the probability of a byte having the value "1" is 0.05. Given this probability, the 0th order entropy of a file, H(S), may be calculated according to the below formula:

$$H(S) = -\Sigma p_i \log_2 p_i \qquad \text{Formula 1}$$

where $p_i$ is the probability of value i. The entropy calculation is context free, that is, not tied to any specific file format. Thus, embodiments of the present invention may be applied to all types of files including but not limited to text files, image files, audio files, executable files, and the like.

Figure 5:
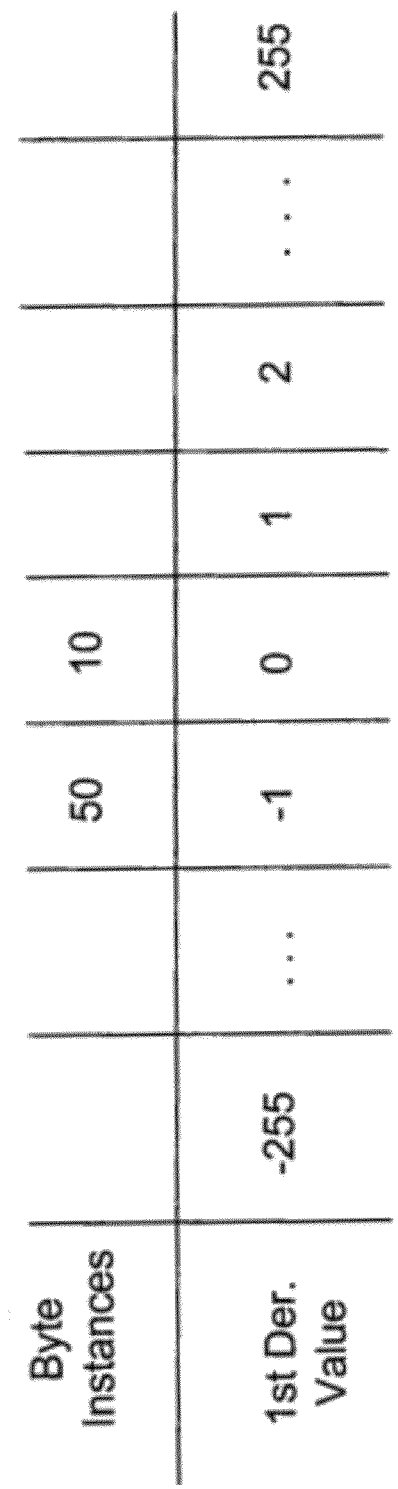
FIG. 5 is a conceptual layout diagram for organizing 1st derivative values for calculating a 0th order entropy of a file according to one embodiment of the invention.

FIG. 5 is a conceptual layout diagram for organizing 1st derivative values (i.e. differential values for different byte pairs) for calculating a 0th order entropy of a file, hereinafter referred to as a 0th order differential entropy, according to one embodiment of the invention. In the embodiment where the character values range from 0-255, the range of possible differential values are from −255 to 255. The example of FIG. 5 shows that there are 50 bytes of data with a differential value of "−1," whereas there are 10 bytes of data with a differential value of 0. Thus, according to this example, if a file has 200 bytes of data, the probability of a differential value of "−1" is 0.25, whereas the probability of a differential value of "0" is 0.05. Given this probability, the 0th order differential entropy may be calculated according to above Formula 1.

According to one embodiment, the entropy calculation may also consider the probability of a pair of adjacent bytes having a particular pair of values. As in the embodiment of FIGS. 4 and 5, those values might be a 0th derivative values (i.e. the data itself), or 1st derivative values (differential values), depending on the configuration of the document comparison module 200. For either value, a 1st order entropy calculation counts a number times a certain byte associated with a first value is immediately preceded by another byte associated with a second value, for determining the probability that a byte pair in the file will take those values.

Figure 6:
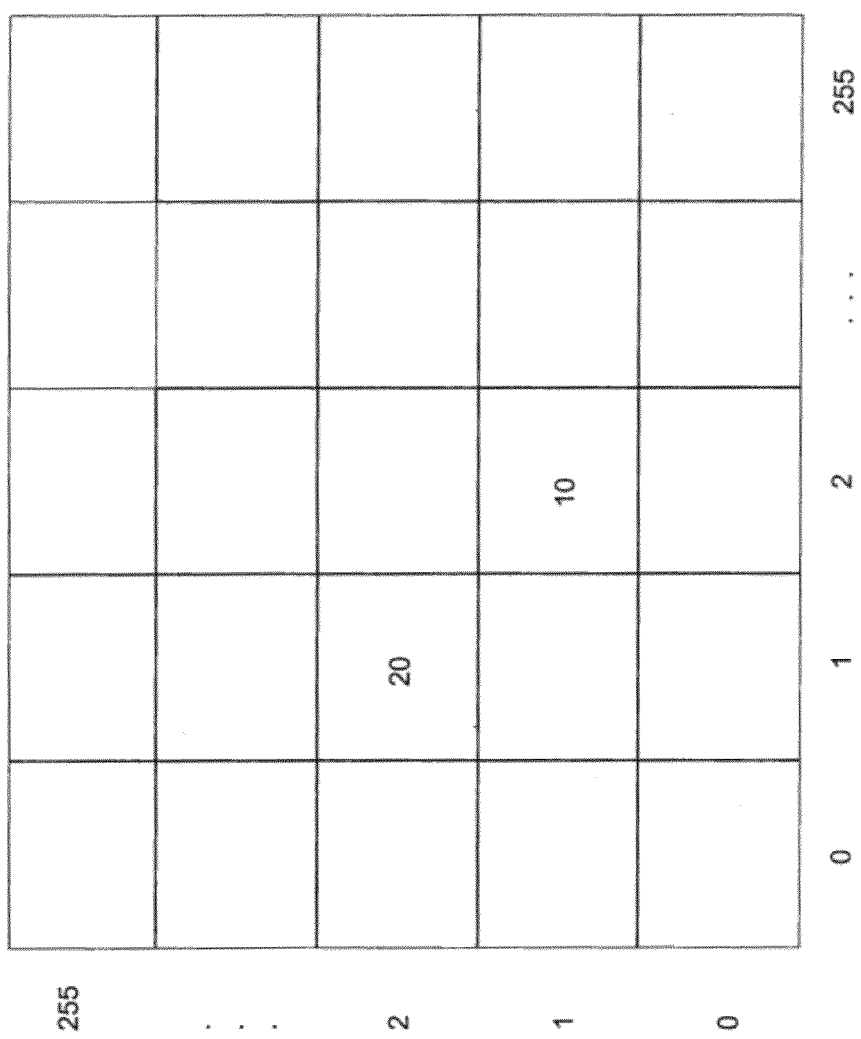
FIG. 6 is a conceptual layout diagram for organizing 0th derivate values of a file for calculating a 1st order entropy according to one embodiment of the invention.

FIG. 6 is a conceptual layout diagram for organizing 0th derivate values of a file for calculating a 1st order entropy according to one embodiment of the invention. In the illustrated example, the 0th derivative values are organized in a matrix which size depends on the potential values in a character set supported by the system. According to one embodiment of the invention, the size of the matrix is 256×256.

The example of FIG. 6 shows that 10 bytes of the file have a value "2" immediately preceded by a byte having a value "1," and 20 bytes of the file have a value "1" immediately preceded by a byte having a value "2." A person of skill in the art should recognize that instead of the values in the vertical axis representing the values that immediately precede the values in the horizontal axis, the values in the vertical axis may represent the values that immediately follow the values in the horizontal axis.

According to the example in FIG. 6, if a file has 200 bytes of data, the probability that a byte having a value "2" will be immediately preceded by a byte having a value "1" is 0.05, and the probability that a byte having the value "1" will be immediately preceded by a byte having a value "2" is 0.5. Given this probability, the 1st order entropy of a file, H(S), may be calculated according to the below formula.

$$H(S) = -\sum_i p_i \sum_j p_i(j) \log_2 p_i(j) \qquad \text{Formula 2}$$

where i is a certain preceding character, and $p_i(i)$ is the probability of j given i as the previous character. Although characters are used as an example, a person of skill in the art should recognize that the entropy calculation may be performed for all types of files in a context free manner.

Figure 7:
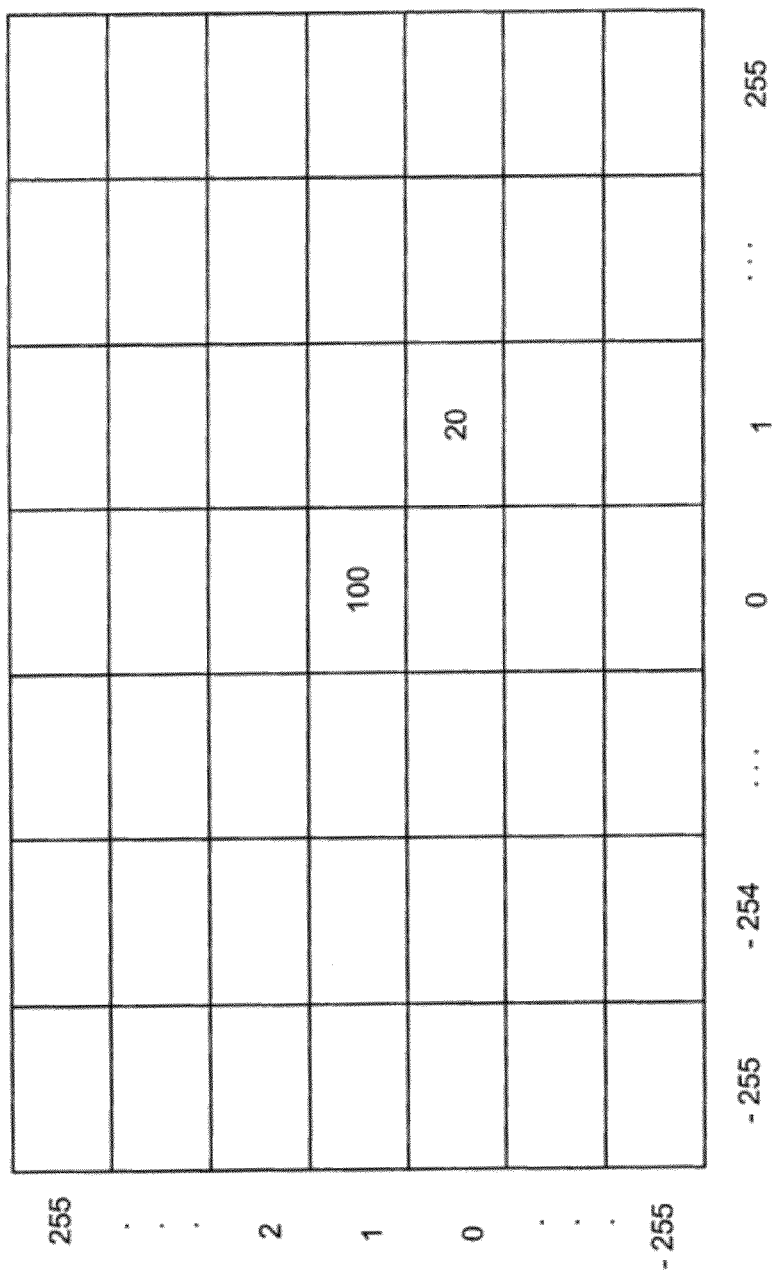
FIG. 7 is a conceptual layout diagram for organizing 1st derivative values of a file for calculating a 1st order entropy according to one embodiment of the invention.

FIG. 7 is a conceptual layout diagram for organizing 1st derivative values of a file for calculating a 1st order entropy of a file, hereinafter referred to as a 1st order differential entropy, according to one embodiment of the invention. The matrix that is used to organize the differential values is the same as the matrix in FIG. 6, except that the matrix also accounts for negative differential values.

The example of FIG. 7 shows that the file has 20 bytes with a differential value of "1," each of which is immediately preceded by a byte having a differential value of "0," and 100 bytes with a differential value of "0," each of which is immediately preceded by a byte having a differential value of "1."

According to the example in FIG. 7, if a file has 200 bytes of data, the probability that a byte having a differential value of "1" will be immediately preceded by a byte having a differential value of "0" is 0.1, and the probability that a byte having a differential value "0" will be immediately preceded by a byte having a differential value "1" is 0.5. Given this probability, the 1st order differential entropy of the file may be calculated according to the above Formula 2.

Figure 8:
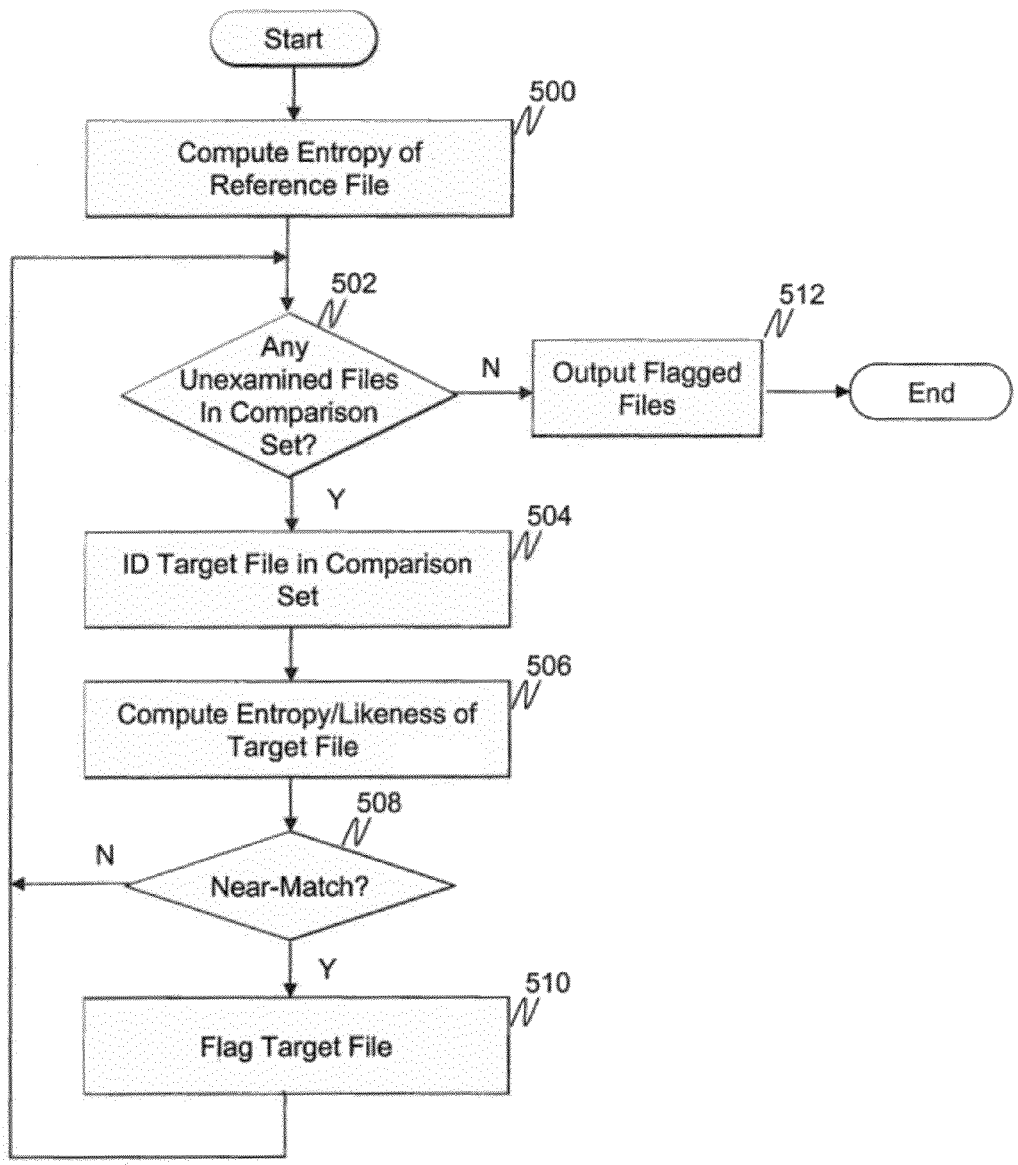
FIG. 8 is a flow diagram of a process of a document comparison module for performing an entropy-based near-match analysis according to one embodiment of the invention.

FIG. 8 is a flow diagram of a process of the document comparison module 200 for performing an entropy-based near-match analysis according to one embodiment of the invention. The process is executed by a computing processor (i.e. processor 30) according to instructions retrieved from a computer-readable media.

The process starts, and in step 500, the computing processor computes the entropy value of one or more reference files, and outputs a number, for example, between 0 and 8. The higher the entropy value, the more random and unpredictible the contents of the file. Alternatively, if the entropy value has already been computed, the processor simply retrieves the entropy value that has been stored for the reference file(s).

According to one embodiment of the invention, the entropy value is a 0th order entropy or a 0th order differential entropy. According to another embodiment of the invention, the entropy value is a 1st order entropy or a 1st order differential entropy.

According to one embodiment of the invention, the entropy value that is computed or retrieved in step 500 is a weighted entropy value that is based on the size of the file that is the subject of the computation. Thus, if two files have similar entropy values but differ in their file size, such difference is reflected via the weighted entropy value. If a weighted entropy is not used, the original entropy value calculated via Formula 1 or 2 may be used instead.

A weighted entropy value (WEntropy) may be computed based on the following formula. The natural logarithm function may be substituted with a log function.

$$W\text{Entropy} = \text{Entropy} \times \ln(\text{Filesize})$$

In step 502, a determination is made by the computing processor as to whether there are files in a comparison set that still need to be considered. If the answer is YES, a specific target file is identified in step 504. The comparison set may include all or a portion of target files in all or particularly selected target machines.

In step 506, the entropy of the identified target file is computed by the computing processor. According to one embodiment of the invention, the computed entropy uses the same parameters that were used when computing the entropy of the reference file. Such parameters may relate, for example, to the Markov order (i.e. the order of the entropy calculation), a derivative order (e.g. a 0th order derivative of the data or a 1st order derivative of the data), or other configuration settings of the document comparison module 200.

According to one embodiment of the invention, the entropy calculation may be performed by the computing processor in a target machine 117 storing the identified target file. The target machine transmits the calculated entropy value to the examining machine 115 over the secure data communications network 103. The entropy value is compact and fixed in size (e.g. 8 bytes), allowing efficiency in transmission of the value as well as in the processing during the near-match analysis.

According to one embodiment of the invention, the computed entropy values are used to determine a likeness of content contained in the target file to the content in the reference file. In this regard, the computing processor computes a likeness value for the target file in relation to the reference file based, at a minimum, on the entropy values of each respective file. According to one embodiment of the invention, the likeness value is based on a difference of the entropy values and a difference in the size of the target and reference files. Thus, the likeness value is a weighted entropy difference that not only takes into account differences in the entropy values, but also takes into account differences in the file sizes. An exemplary formula for computing the likeness value is:

$$\text{Likeness} = \log(E1 - E2) \times \log(S1 - S2)$$

where E1 is a weighted entropy of the reference file, E2 is a weighted entropy of the target file, S1 is a size of the reference file, and S2 is a size of the target file.

In step 508, a determination is made as to whether a near-match may be concluded between the target file and the reference file being considered. In this regard, the computing processor considers whether the target file differs from the reference file by no more than a threshold tolerance amount. A default threshold tolerance amount may be set by the document comparison module. The default amount may, however, be adjusted via a user command. As a person of skill in the art should appreciate, the threshold determines how similar to dissimilar the returned files will be to the reference file.

According to one embodiment of the invention, the threshold tolerance amount is a threshold entropy difference value. An exemplary threshold entropy difference value is 0.001. In an embodiment where the threshold entropy difference is used for determining whether a target file is similar to the reference file, the computing processor computes a difference between the entropy value of the reference file and the entropy value of the target file, and determines if the difference is within (e.g. equal or below) the set threshold.

The tolerance threshold amount may alternatively take the form of a likeness threshold that may be set between 0 and 100. The higher the likeness threshold, the more similar the files that are returned to the reference file. For example, if a likeness threshold is set to be 100, only exact matches are returned.

In an embodiment where the likeness threshold is used for determining whether a target file is similar to the reference file, the computing processor computes the likeness value for the target file in relation to the reference file, and compares this against the set tolerance threshold amount.

Regardless of the particular threshold tolerance amount that is used, if the difference between the target file and the reference file(s) is within the set tolerance threshold amount, the target file is flagged in step 510 as a near-match. Furthermore, if multiple references files were used to perform the comparison, the particular reference file to which the target file is deemed to be similar is also flagged. The flagged target files are thus identified as being similar to the particular reference file.

According to one embodiment of the invention, the computing of the likeness value or entropy difference (depending on the embodiment being used), and the comparing against the threshold tolerance amount to determine whether a target file is similar (or dissimilar) to the reference file(s), are all performed by the computing processor in the examining machine 115 based on entropy values returned by the target machines 117. A person of skill in the art should appreciate that the computation may also be performed by the target machines by other computing devices coupled to the examining machine 115.

If there are no more files in either the target machine or a set of defined files to examine, the flagged files are output in step 512 as files that nearly matched the one or more reference files within the set threshold. In this regard, a list of the flagged files are displayed on a display screen of the examining machine 115 for further review. The number of files that are displayed depends on whether the user has specified a size of the search results. If such a size has been specified, the list of files that are output do not exceed the specified size, and the selected files are ones with the largest likeness value or smallest entropy difference depending on the embodiment being used.

According to one embodiment of the invention, the examining machine 115 may command the target machine 117 to transmit content of one or more of the output files to the examining machine over the data communications network. If the content of the output files already have been transmitted to the examining machine by the target machine, no such command may need to be transmitted. Alternatively, the transmission of the content may occur automatically without a specific command from the examining machine.

According to one embodiment of the invention, the examiner may modify the tolerance threshold and/or search result size based on the number of files that are output by the document comparison module. For example, if the number of output files are in the thousands, the Examiner may want to decrease the threshold value to reduce the number of flagged files, or reduce the search result size.

According to one embodiment of the invention, the document comparison module 200 stores a set of default parameters for performing entropy-based near-match analyses. These default parameters may be modified by an examiner by accessing the document comparison module 200 via the examiner device 119. If the document comparison module 200 resides in the target machine, the examiner device 119 is used to transmit commands to the servlet for modifying the configuration parameters of the document comparison module.

According to one embodiment of the invention, the configurable parameters include: Markov order, derivative order, sequence, mask, tolerance threshold, result size, and/or the like. The Markov order is the order of the entropy calculation, and may be set to be 0 or 1. According to one embodiment, the default Markov order is 1 for a 1st order entropy calculation.

The derivative order is the order of the derivative to be taken for the data in the file for which the entropy calculation is being made, and may be set to be 0 or 1. According to one embodiment, the default derivative order is 0 for taking a 0th order derivative of the data in the file.

According to one embodiment of the invention, other parameters may also be set for excluding certain bytes of data in the file which have an unnecessarily large effect on the entropy of a file for purposes of forensic investigation. One such parameter is a sequence parameter which indicates a number of repeated bytes to allow before ignoring the value. For example, a sequence parameter of N indicates that if a byte is repeated more than N times, the repeated bytes after N are to be ignored until the value changes. According to one embodiment of the invention, the default sequence is 2. Thus, if a file includes the sequence "1, 2, 3, 4, 4, 7, 5, 5, 5, 5, 5," and the sequence is set to be 2, the document comparison module ignores the last three bytes containing the value "5," and treats the file as if it contained "1, 2, 3, 4, 4, 7, 5, 5."

Another parameter that is set to ignore certain values as input is the mask parameter. By default, the mask is set to ignore a value "0" in order to mask the trivial difference between Unicode and ASCII text. For example, in Unicode, the word HELLO is represented as "H 0 E 0 L 0 L 0," whereas in ASCII, there are no intervening 0 values between each character value. Thus, the 0's are masked by default for calculating the entropy of a file containing Unicode text.

As stated before, it is easy to manufacture files that have the exact same entropy values, although they are different. For example:

FILE 1: 0, 0, 0, 0, 0
FILE 2: 1, 1, 1, 1, 1
FILE 3: 2, 2, 2, 2, 2

The above three files share the same entropy value even if there is not even a single byte of data that is shared among them. The advantage to using entropy calculations as a tool for identifying almost identical files is that a human would generally consider the exemplary three files to be "essentially the same." Thus, if an examiner were to search for any file that was close to FILE 1, the document comparison module 200 would return all other "wiped" files (i.e. FILES 2 and 3).

Figure 9A:
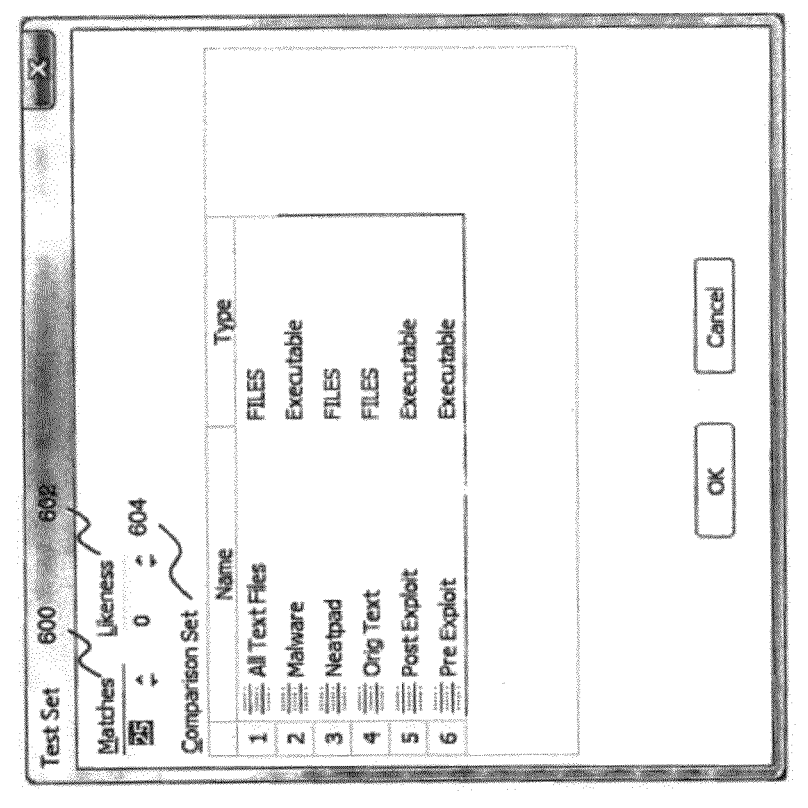
Figure 9B:
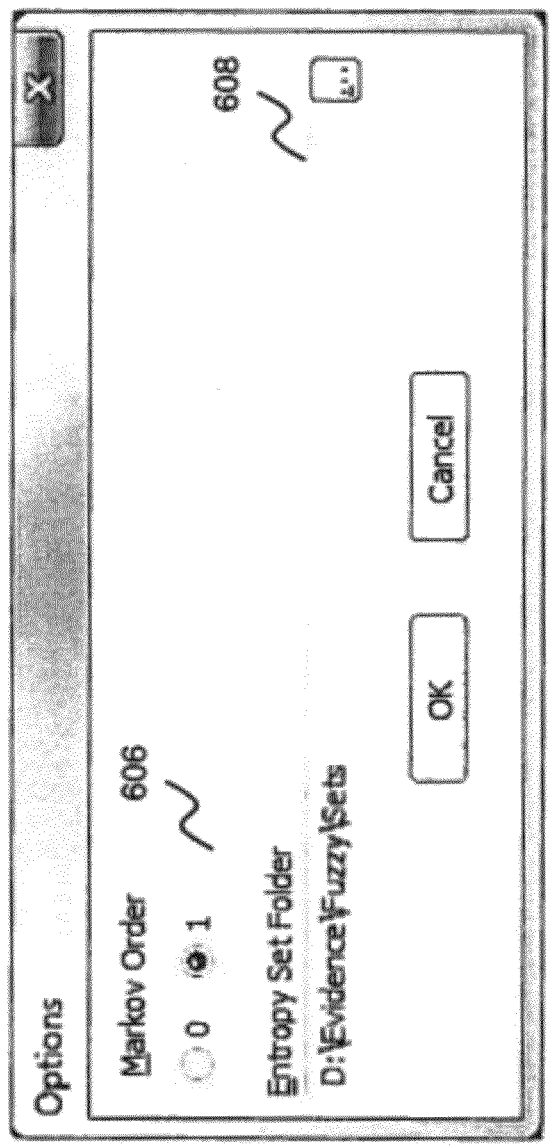

FIGS. 9A-9B are screen shots of a graphical user interface (GUI) provided by the document comparison module 200 for configuring certain parameters of the document comparison module for performing an entropy-based near-match analysis according to one embodiment of the invention. In this regard, the GUI provides a first field 600 that is manipulated by a user to set a number of matches to be returned. The GUI also provides a second field 602 that is manipulated by the user to set a likeness threshold value. The user may also identify via a third field 604 the types of files that are to be considered for comparison against a reference file. Such files may be text files, executable files, and the like.

As is depicted in FIG. 9B, the user may also set a Markov order 606 and identify a location 608 in which the entropy-based near-match analysis results are to be stored.

Figure 10:
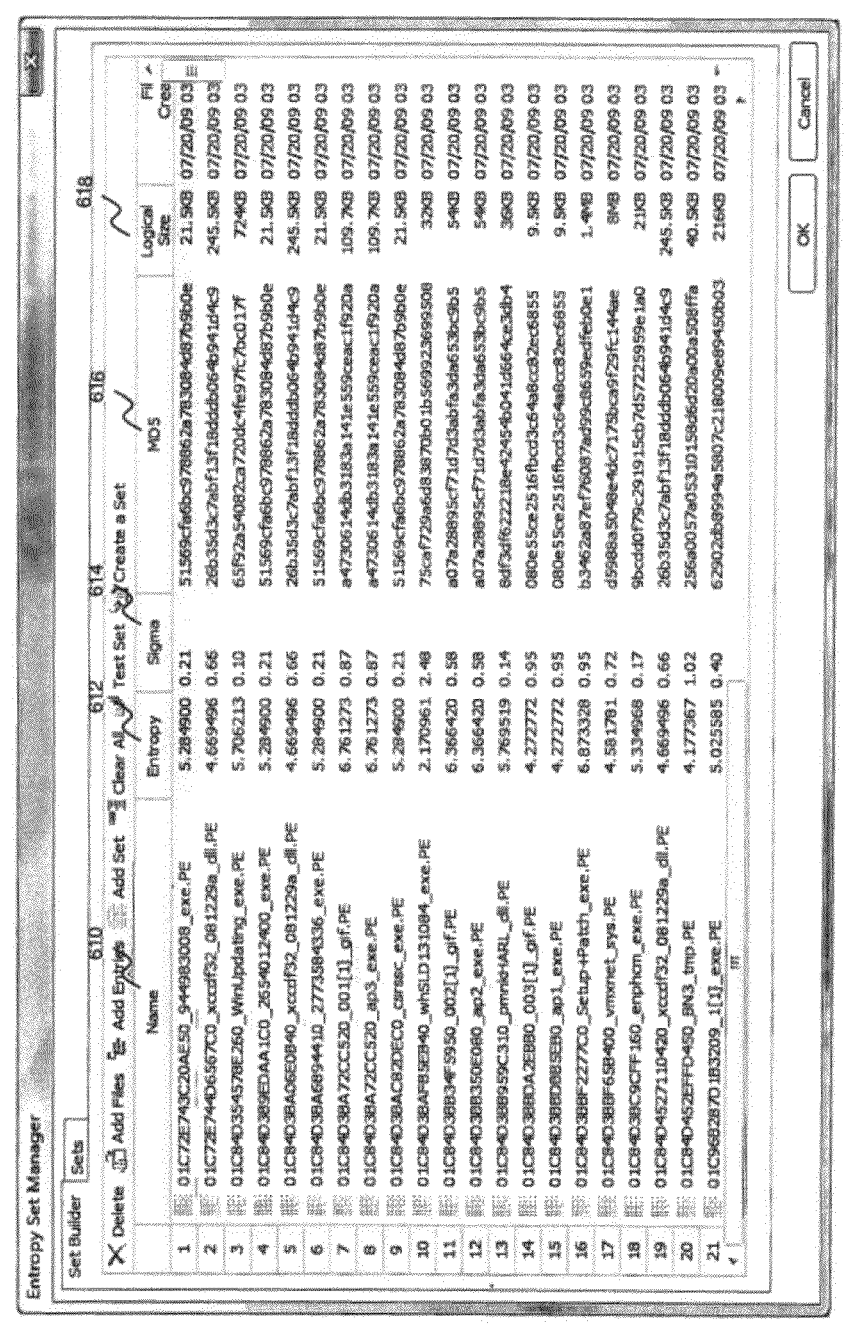

FIG. 10 is a screen shot of a GUI provided by the document comparison module for building entropy sets according to one embodiment of the invention. An entropy set includes one or more reference files and associated entropy values that are to be compared against a comparison set. The entropy set may identify a name 610 of a reference file, an entropy value 612, a standard deviation 614, a hash value 616, a size 618 of the file, and the like. Once the entropy set is defined, the entire set may be compared against a comparison set during a single analysis session. According to one embodiment of the invention, the document comparison module includes into the comparison set, the types of files defined in field 604, for all target machines in the network, particular target machines selected by a user, particular directories, folders, or storage locations, and the like.

Figure 11:
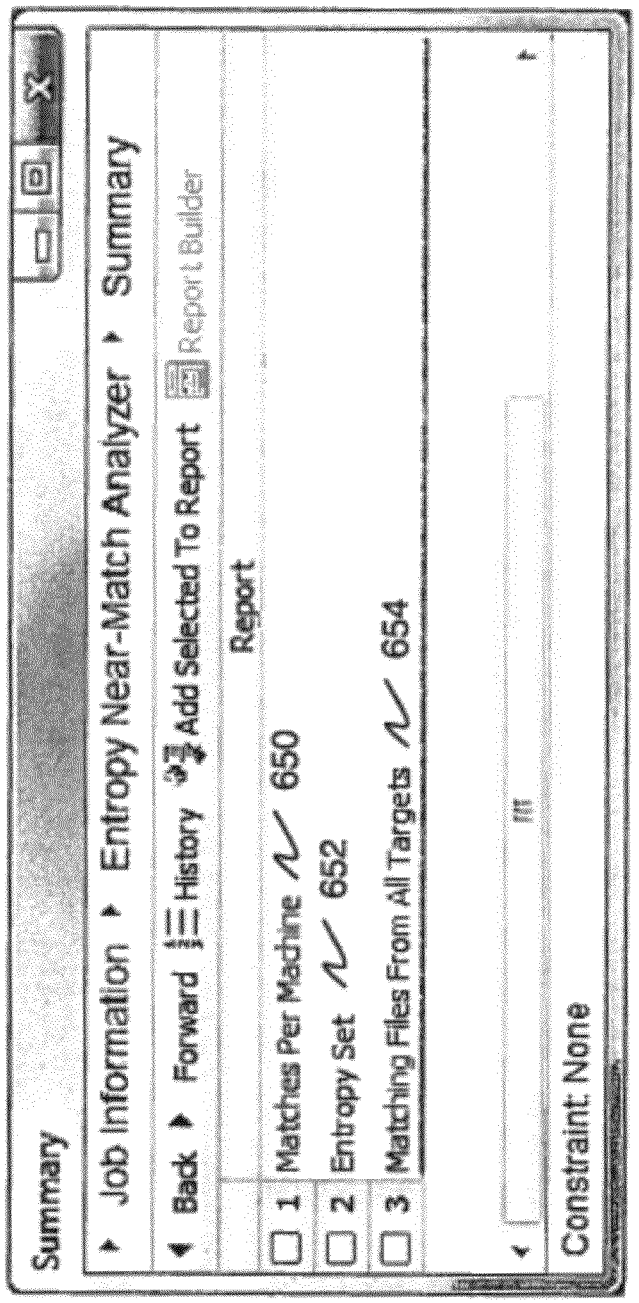
FIG. 11 is a screen shot of a GUI for providing a summary of an entropy-based near-match analysis according to one embodiment of the invention.

FIG. 11 is a screen shot of a GUI for providing a summary of an entropy-based near-match analysis according to one embodiment of the invention. A user may select a first option 650 to view information on matches per target machine, a second option 652 to view information on the entropy set used for the analysis, and a third option 654 to view information on matching files from all considered targets.

Figure 12:
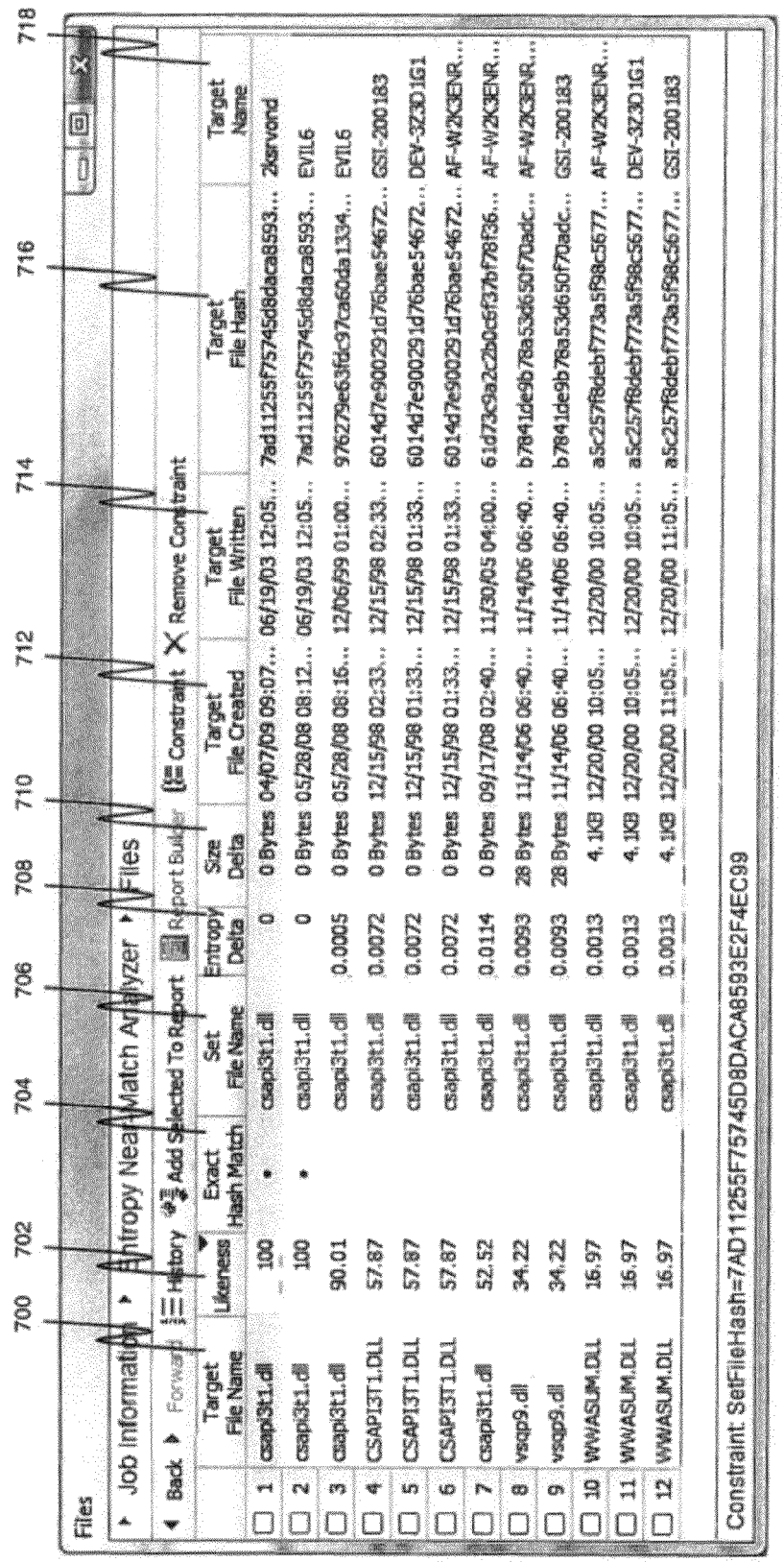
FIG. 12 is a screen shot of a GUI for providing information on matching files from all considered targets according to one embodiment of the invention.

FIG. 12 is a screen shot of a GUI for providing information on matching files from all considered targets according to one embodiment of the invention. The analysis results may include, for example, a target file name 700, a likeness value 702 between the target file and a considered reference file, as well as an indication as to whether a hash value of the target file is identical to a hash value of a reference file 704. In this regard, the document comparison module initially compares the hash values of the target file and the reference file for first determining an exact match. If the hash values differ, the document comparison module proceeds to engage in the entropy-based analysis for determining whether, although the files are not identical, they are similar enough for concluding a near-match. As discussed above, the determination as to whether the files are similar enough is based on the set threshold tolerance amount.

The analysis results may further include a name of the reference file 706 that resulted in the match or near match, an entropy difference 708 between the target and reference files, and a size difference 710 between the two files. The analysis results may further include additional information about the target file including, for example, a date in which the target file was created 712, a date in which the target file was written 714, a hash value for the target file 716, and a name of the target machine 718 in which the target file is stored.

FIG. 13 is a screen shot of a GUI for providing information on matches per target machine according to one embodiment of the invention. The information includes a name of the target machine 800 that was considered during the analysis, a number of files that resulted in exact matches with the reference files in the entropy set 802, a maximum likeness value 804 among the likeness values returned for the target machine as near-matches, an average likeness value 806 based on all likeness values returned for the target machine as near-matches, and a number of the near-matches 808 returned for the target machine.

According to one embodiment of the invention, the results of the near-match analysis may be output in the form of a report as is depicted in FIG. 14. The report may include information on the entropy set and/or information on the match results on a per machine basis and/or per file basis.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. In a computer forensic investigation system including an examining machine coupled to one or more target machines over a data communications network, a method for identifying one or more files in the one or more target machines that are a near-match to a reference file, the method comprising:
   determining a first weighted entropy value of the reference file, wherein the first weighted entropy value represents an entropy of the reference file weighted based on a size of the reference file;
   determining a second weighted entropy value of a target file stored in the one or more target machines, wherein the second weighted entropy value represents an entropy of the target file weighted based on a size of the target file;
   determining a likeness of content in the target file to content in the reference file based on the first and second weighted entropy values;
   identifying a tolerance threshold;
   determining a near-match between the target file and the reference file if the likeness of the target file to the reference file is within the tolerance threshold; and
   displaying on a display, information on the target file in response to the determining of a near-match.

2. The method of claim 1, wherein the determining of the likeness of content includes:
   computing a difference of the weighted entropy values of the target and reference files.

3. The method of claim 1, wherein the determining of the likeness of content includes:
   computing a weighted difference of the weighted entropy values of the target and reference files, wherein the weighted difference is based on a size difference of the target and reference files.

4. The method of claim 1, wherein the entropy of the reference or target file is calculated for blocks of data contained in the corresponding file.

5. The method of claim 4, wherein the entropy is a 0th order entropy based on a probability that a particular block of data will take a particular value.

6. The method of claim 4, wherein the entropy is a 1st order entropy based on a probability that a pair of adjacent blocks of data will take a particular value pair.

7. The method of claim 1, wherein the entropy is calculated for 1st derivative values of blocks of data contained in the corresponding file.

8. The method of claim 7 further comprising:
   calculating 1st derivative values of the blocks of data, wherein the calculating includes:
      for each block of data, calculating a difference in a value stored in the block of data and a value stored in an adjacent block of data; and
      outputting a differential value in response.

9. The method of claim 7, wherein the entropy is a 0th order entropy based on a probability that a particular block of data will take a particular value.

10. The method of claim 7, wherein the entropy is a 1st order entropy based on a probability that a pair of adjacent data blocks will take a particular pair of values.

11. The method of claim 1 further comprising:
    receiving the target file transmitted by the target machine over the data communications network; and
    displaying the target file on a display monitor by the examining machine for conducting a forensic investigation of the target machine.

12. An examining machine coupled to one or more target machines over a data communications network, the examining machine comprising:
    a display device;
    processor coupled to the display device; and
    a memory operably coupled to the processor and having program instructions stored therein, the processor being operable to execute the program instructions, the program instructions including:
       determining a first weighted entropy value of the reference file, wherein the first weighted entropy value represents an entropy of the reference file weighted based on a size of the reference file;
       determining a second weighted entropy value of a target file stored in the one or more target machines, wherein the second weighted entropy value represents an entropy of the target file weighted based on a size of the target file;
       determining a likeness of content in the target file to content in the reference file based on the first and second weighted entropy values;
       identifying a tolerance threshold;
       determining a near-match between the target file and the reference file if the likeness of the target file to the reference file is within the tolerance threshold; and
       displaying on the display device information on the target file in response to the determining of a near-match.

13. The examining machine of claim 12, wherein the program instructions that determine the likeness of content include program instructions that:
    compute a difference of the weighted entropy values of the target and reference files.

14. The examining machine of claim 12, wherein the program instructions that determine the likeness of content include program instructions that:
    compute a weighted difference of the weighted entropy values of the target and reference files, wherein the weighted difference is based on a size difference of the target and reference files.

15. The examining machine of claim 12, wherein the entropy of the reference or target file is calculated for blocks of data contained in the corresponding file.

16. The examining machine of claim 15, wherein the entropy is a 0th order entropy based on a probability that a particular block of data will take a particular value.

17. The examining machine of claim 15, wherein the entropy is a 1st order entropy based on a probability that a pair of adjacent blocks of data will take a particular value pair.

18. The examining machine of claim 12, wherein the entropy is calculated for 1st derivative values of blocks of data contained in the corresponding file.

19. The examining machine of claim 18, wherein the program instructions further include:
  calculating 1st derivative values of the blocks of data, wherein the calculating includes:
    for each block of data, calculating a difference in a value stored in the block of data and a value stored in an adjacent block of data; and
    outputting a differential value in response.

20. The examining machine of claim 18, wherein the entropy is a 0th order entropy based on a probability that a particular block of data will take a particular value.

21. The examining machine of claim 18, wherein the entropy is a 1st order entropy based on a probability that a pair of adjacent data blocks will take a particular pair of values.

22. The examining machine of claim 12, wherein the program instructions further include:
  receiving the target file transmitted by the target machine to the examining machine over the data communications network; and
  displaying the target file on a display monitor for conducting a forensic investigation of the target machine.

23. A computer forensic investigation system for identifying one or more files in one or more target machines that are a near-match to a reference file, the system comprising:
  means for determining a first weighted entropy value of the reference file, wherein the first weighted entropy value represents an entropy of the reference file weighted based on a size of the reference file;
  means for determining a second weighted entropy value of a target file stored in the one or more target machines, wherein the second weighted entropy value represents an entropy of the target file weighted based on a size of the target file;
  means for determining a likeness of content in the target file to content in the reference file based on the first and second weighted entropy values;
  means for identifying a tolerance threshold;
  means for determining a near-match between the target file and the reference file if the likeness of the target file to the reference file is within the tolerance threshold; and
  means for displaying information on the target file in response to the determining of a near-match.

24. In a computer forensic investigation system including an examining machine coupled to one or more target machines over a data communications network, a method for identifying one or more files in the one or more target machines that are a near-match to a reference file, the method comprising:
  determining a first entropy value of the reference file, wherein the first entropy value is a a 0th order entropy value based on a probability that a particular block of data of the reference file will take a particular value;
  determining a second entropy value of a target file stored in the one or more target machines, wherein the second entropy value is a 0th order entropy value based on a probability that a particular block of data of the target file will take a particular value;
  determining a likeness of content in the target file to content in the reference file based on the first and second entropy values;
  identifying a tolerance threshold;
  determining a near-match between the target file and the reference file if the likeness of the target file to the reference file is within the tolerance threshold; and
  displaying on a display, information on the target file in response to the determining of a near-match.

25. In a computer forensic investigation system including an examining machine coupled to one or more target machines over a data communications network, a method for identifying one or more files in the one or more target machines that are a near-match to a reference file, the method comprising:
  determining a first entropy value of the reference file, wherein the first entropy value is a 1st order entropy value based on a probability that a pair of adjacent blocks of data of the reference file will take a particular value pair;
  determining a second entropy value of a target file stored in the one or more target machines, wherein the second entropy value is a 1st order entropy value based on a probability that a pair of adjacent blocks of data of the target file will take a particular value pair;
  determining a likeness of content in the target file to content in the reference file based on the first and second entropy values;
  identifying a tolerance threshold;
  determining a near-match between the target file and the reference file if the likeness of the target file to the reference file is within the tolerance threshold; and
  displaying on a display, information on the target file in response to the determining of a near-match.

26. In a computer forensic investigation system including an examining machine coupled to one or more target machines over a data communications network, a method for identifying one or more files in the one or more target machines that are a near-match to a reference file, the method comprising:
  determining a first entropy value of the reference file, wherein the first entropy value is based on 1st derivative values of blocks of data contained in the reference file;
  determining a second entropy value of a target file stored in the one or more target machines, wherein the second entropy value is based on 1st derivative values of blocks of data contained in the target file;
  determining a likeness of content in the target file to content in the reference file based on the first and second entropy values;
  identifying a tolerance threshold;
  determining a near-match between the target file and the reference file if the likeness of the target file to the reference file is within the tolerance threshold; and
  displaying on a display, information on the target file in response to the determining of a near-match.

27. The method of claim 26 further comprising:
  calculating 1st derivative values of the blocks of data, wherein the calculating includes:
    for each block of data, calculating a difference in a value stored in the block of data and a value stored in an adjacent block of data; and
    outputting a differential value in response.

28. The method of claim 26, wherein the entropy value is a 0th order entropy value based on a probability that a particular block of data will take a particular value.

29. The method of claim 26, wherein the entropy value is a 1st order entropy value based on a probability that a pair of adjacent data blocks will take a particular pair of values.

30. An examining machine coupled to one or more target machines over a data communications network, the examining machine comprising:
  a display device;
  processor coupled to the display device; and
  a memory operably coupled to the processor and having program instructions stored therein, the processor being operable to execute the program instructions, the program instructions including:
  determining a first entropy value of the reference file, wherein the first entropy value is a a 0th order entropy value based on a probability that a particular block of data of the reference file will take a particular value;
  determining a second entropy value of a target file stored in the one or more target machines, wherein the second entropy value is a 0th order entropy value based on a probability that a particular block of data of the target file will take a particular value;
  determining a likeness of content in the target file to content in the reference file based on the first and second entropy values;
  identifying a tolerance threshold;
  determining a near-match between the target file and the reference file if the likeness of the target file to the reference file is within the tolerance threshold; and
  displaying on the display device information on the target file in response to the determining of a near-match.

31. An examining machine coupled to one or more target machines over a data communications network, the examining machine comprising:
  a display device;
  processor coupled to the display device; and
  a memory operably coupled to the processor and having program instructions stored therein, the processor being operable to execute the program instructions, the program instructions including:
    determining a first entropy value of the reference file, wherein the first entropy value is a 1st order entropy value based on a probability that a pair of adjacent blocks of data of the reference file will take a particular value pair;
    determining a second entropy value of a target file stored in the one or more target machines, wherein the second entropy value is a 1st order entropy value based on a probability that a pair of adjacent blocks of data of the target file will take a particular value pair;
    determining a likeness of content in the target file to content in the reference file based on the first and second entropy values;
    identifying a tolerance threshold;
    determining a near-match between the target file and the reference file if the likeness of the target file to the reference file is within the tolerance threshold; and
    displaying on the display device information on the target file in response to the determining of a near-match.

32. An examining machine coupled to one or more target machines over a data communications network, the examining machine comprising:
  a display device;
  processor coupled to the display device; and
  a memory operably coupled to the processor and having program instructions stored therein, the processor being operable to execute the program instructions, the program instructions including:
    determining a first entropy value of the reference file, wherein the first entropy value is based on 1st derivative values of blocks of data contained in the reference file;
    determining a second entropy value of a target file stored in the one or more target machines, wherein the second entropy value is based on 1st derivative values of blocks of data contained in the target file;
    determining a likeness of content in the target file to content in the reference file based on the first and second entropy values;
    identifying a tolerance threshold;
    determining a near-match between the target file and the reference file if the likeness of the target file to the reference file is within the tolerance threshold; and
    displaying on the display device information on the target file in response to the determining of a near-match.

33. The examining machine of claim 32, wherein the program instructions further include:
  calculating 1st derivative values of the blocks of data, wherein the calculating includes:
    for each block of data, calculating a difference in a value stored in the block of data and a value stored in an adjacent block of data; and
    outputting a differential value in response.

34. The examining machine of claim 32, wherein the entropy value is a 0th order entropy value based on a probability that a particular block of data will take a particular value.

35. The examining machine of claim 32, wherein the entropy value is a 1st order entropy value based on a probability that a pair of adjacent data blocks will take a particular pair of values.

* * * * *